(12) United States Patent
Kim et al.

(10) Patent No.: US 11,307,593 B2
(45) Date of Patent: Apr. 19, 2022

(54) ARTIFICIAL INTELLIGENCE DEVICE FOR GUIDING ARRANGEMENT LOCATION OF AIR CLEANING DEVICE AND OPERATING METHOD THEREOF

(71) Applicant: LG ELECTRONICS INC., Seoul (KR)

(72) Inventors: Kokeun Kim, Seoul (KR); Suyeon Kim, Seoul (KR); Kamin Lee, Seoul (KR); Seungah Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 294 days.

(21) Appl. No.: 16/539,810

(22) Filed: Aug. 13, 2019

(65) Prior Publication Data

US 2019/0369628 A1 Dec. 5, 2019

(30) Foreign Application Priority Data

Jul. 22, 2019 (KR) .................... 10-2019-0088608

(51) Int. Cl.
*G05D 1/02* (2020.01)
*G05D 1/00* (2006.01)
(Continued)

(52) U.S. Cl.
CPC ......... *G05D 1/0221* (2013.01); *B01D 46/429* (2013.01); *B01D 46/46* (2013.01);
(Continued)

(58) Field of Classification Search
CPC ............. G05D 1/0221; G05D 1/0219; G05D 2201/0203; G05D 2201/0215;
(Continued)

(56) References Cited

U.S. PATENT DOCUMENTS 10,839,608 B2 * 11/2020 Mittleman .............. G06T 15/30
10,887,189 B2 * 1/2021 Flores Guerra ......... H04L 41/12
(Continued)

FOREIGN PATENT DOCUMENTS

JP 3996140 B2 10/2007
JP 2016142489 8/2016
(Continued)

OTHER PUBLICATIONS

Korean Intellectual Property Office Application Serial No. 10-2019-0088608, Office Action dated Nov. 11, 2020, 6 pages.
(Continued)

*Primary Examiner* — Nicholas Kiswanto
(74) *Attorney, Agent, or Firm* — Lee Hong Degerman Kang & Waimey

(57) ABSTRACT

An artificial intelligence (AI) device for guiding an arrangement location of an air cleaning device includes a memory to store an air cleaning device arrangement model to infer the arrangement location of the air cleaning device based on information on fine dust in a house and a processor configured to acquire information on a map of the house and information on fine dust distribution in the house, and to determine the arrangement location of the air cleaning device based on the information on the map and the information on the fine dust distribution, by using the air cleaning device arrangement model.

14 Claims, 10 Drawing Sheets

(51) Int. Cl.
  *B01D 46/42*   (2006.01)
  *B01D 46/46*   (2006.01)
  *G06N 3/08*    (2006.01)
  *A47L 9/28*    (2006.01)
(52) U.S. Cl.
  CPC .......... *G05D 1/0088* (2013.01); *G05D 1/0219* (2013.01); *G06N 3/08* (2013.01); *A47L 9/2815* (2013.01); *A47L 9/2852* (2013.01); *A47L 2201/04* (2013.01); *B01D 2279/55* (2013.01); *G05D 2201/0203* (2013.01); *G05D 2201/0215* (2013.01)
(58) Field of Classification Search
  CPC .. B01D 46/429; B01D 46/46; B01D 2279/55; G06N 3/08; A47L 9/28; A47L 9/2815
  See application file for complete search history.

(56) References Cited

U.S. PATENT DOCUMENTS

| | | | |
|---|---|---|---|
| 11,064,855 | B2* | 7/2021 | Hwang ................... B04C 9/00 |
| 2004/0256474 | A1 | 12/2004 | Park et al. |
| 2005/0279059 | A1 | 12/2005 | Lee et al. |
| 2013/0295835 | A1* | 11/2013 | Fleischer ............. G01N 21/532 454/256 |
| 2016/0195856 | A1* | 7/2016 | Spero ..................... G06N 5/046 700/90 |
| 2018/0021942 | A1 | 1/2018 | Hummel |
| 2020/0167834 | A1* | 5/2020 | Matsuoka ................ G06N 3/08 |
| 2021/0104140 | A1* | 4/2021 | Park ..................... G01N 33/004 |

FOREIGN PATENT DOCUMENTS

| | | |
|---|---|---|
| KR | 20050121454 | 12/2005 |
| KR | 101591735 | 2/2016 |
| KR | 20160100735 | 8/2016 |
| KR | 20180112653 | 10/2018 |

OTHER PUBLICATIONS

Korean Intellectual Property Office Application Serial No. 10-2019-0088608, Notice of Allowance dated May 26, 2021, 6 pages.

\* cited by examiner

ARTIFICIAL INTELLIGENCE DEVICE FOR GUIDING ARRANGEMENT LOCATION OF AIR CLEANING DEVICE AND OPERATING METHOD THEREOF

CROSS-REFERENCE TO RELATED APPLICATIONS

Pursuant to 35 U.S.C. § 119(a), this application claims the benefit of earlier filing date and right of priority to Korean Patent Application No. 10-2019-0088608, filed on Jul. 22, 2019, the contents of which are hereby incorporated by reference herein in its entirety.

BACKGROUND

The present disclosure relates to an artificial intelligence (AI) device to guide the arrangement location of an air cleaning device.

SUMMARY

In general, if a person conducts activities indoors for a long term in the state that a building fails to do sufficient ventilation, carbon dioxide ($CO_2$) and fine dust may be increased. Accordingly, the interior is not maintained to be pleasant, so the ventilation is required.

Recently, air cleaning devices have been mainly used to make indoor air clean.

In particular, an air cleaning device may be arranged in a living room or a main bed room in a house.

A typical air cleaning device is mainly randomly arranged by a user regardless of the fine dust or ultrafine dust distribution in a house.

In this case, the fine dust or the ultrafine dust concentration, which is measured through the air cleaning device, is a numeric value measured around the air cleaning device. Accordingly, the measured numeric value does not indicate the whole fine dust or ultrafine dust concentration in the house.

Accordingly, even if the fine dust or the ultrafine dust concentration is measured as a lower value by the air cleaning device, there may actually exist a zone having a higher fine dust or ultrafine dust concentration.

Accordingly, it is necessary to consider a method of arranging the air cleaning device by accurately reflecting an air condition in the house.

The present disclosure is to provide an AI device capable of guiding the optimal arrangement location of an air cleaning device by reflecting an air condition in a house.

The present disclosure is to provide an AI device capable of guiding the optimal arrangement location of an air cleaning device, by reflecting fine dust distribution, which is varied in real time, in a house.

According to an embodiment of the present disclosure, the arrangement location of the air cleaning device may be determined based on the fine dust distribution representing the air condition in the house by using the arrangement model of the air cleaning device.

According to the present disclosure, the switching in the current arrangement location of the air cleaning device may be guided based on the fine dust distribution which is re-measured.

According to an embodiment of the present disclosure, the user may receive a guide for the optimal arrangement location of the air cleaning device. Accordingly, when the air cleaning device is arranged, the air condition in the house may be significantly improved.

According to an embodiment of the present disclosure, the optimal arrangement location of the air cleaning device is guided in real time, thereby maintaining the optimal air condition in the house.

BRIEF DESCRIPTION OF THE DRAWINGS

The present disclosure will become more fully understood from the detailed description given herein below and the accompanying drawings, which are given by illustration only, and thus are not limitative of the present disclosure, and wherein.

DETAILED DESCRIPTION OF THE EMBODIMENTS

Figure 1:
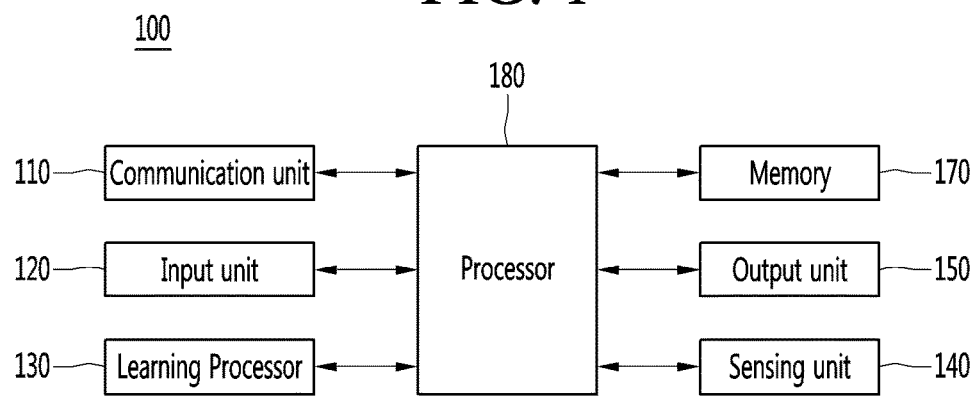
FIG. 1 illustrates an AI device 100 according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present disclosure.

The AI device (or an AI apparatus) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
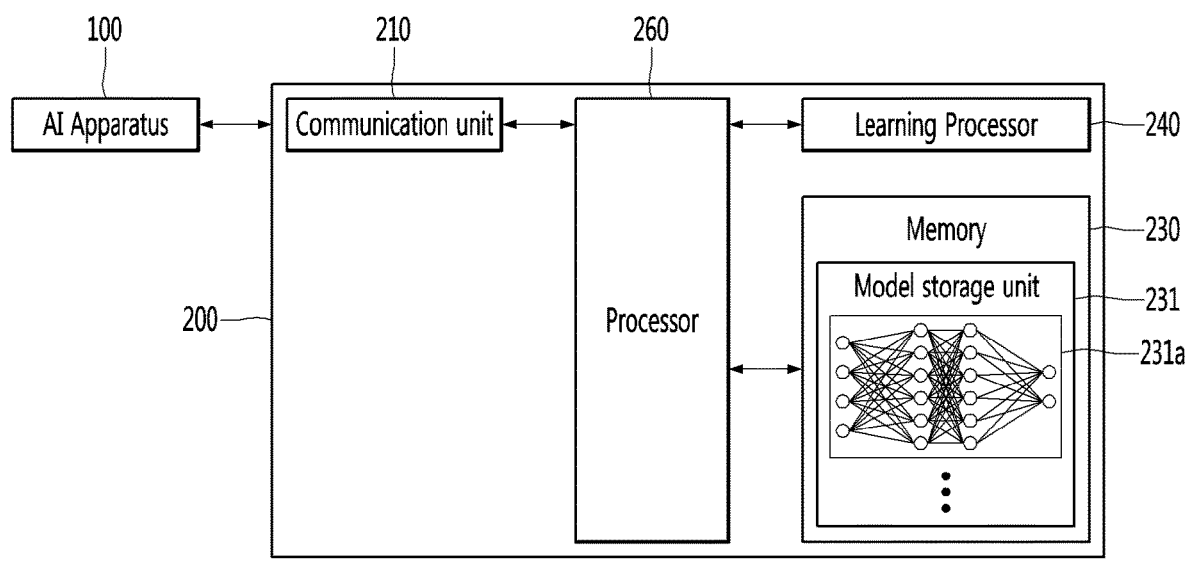
FIG. 2 illustrates an AI server 200 according to an embodiment of the present disclosure.

FIG. 2 illustrates an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models is implemented in software, one or more instructions that constitute the learning model may be stored in memory 230.

The processor 260 may infer the result value for new input data by using the learning model and may generate a response or a control command based on the inferred result value.

Figure 3:
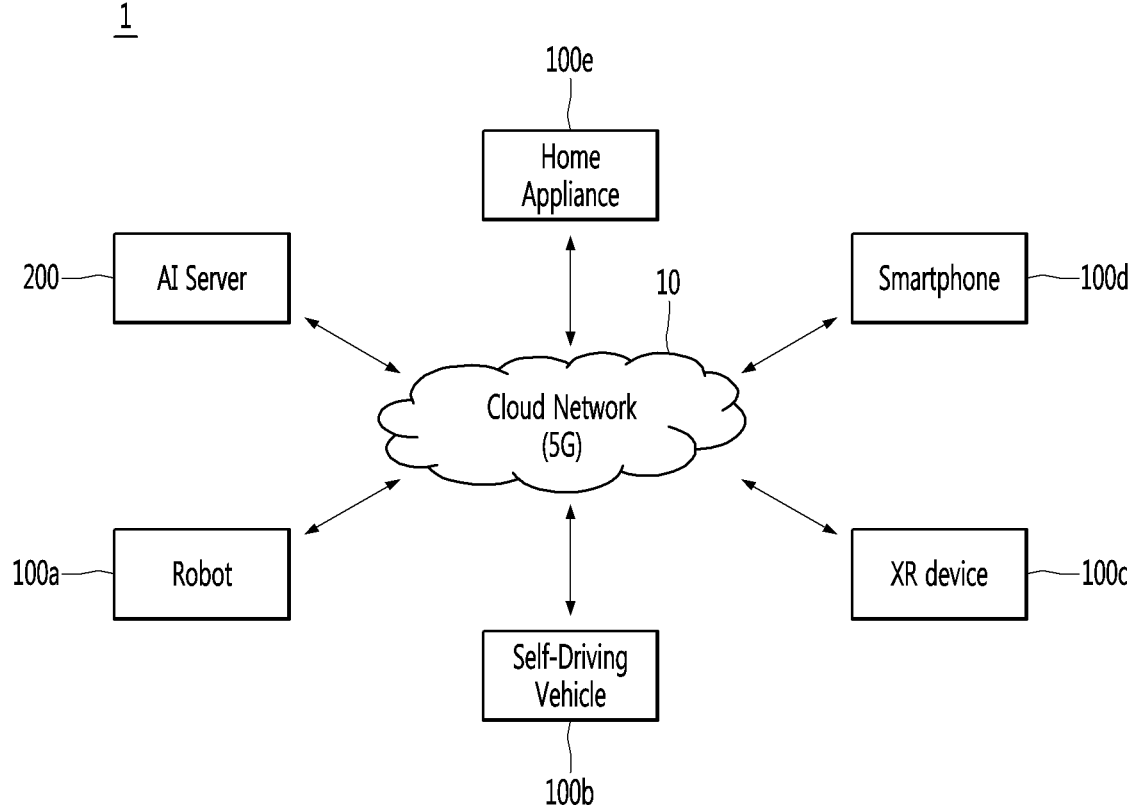
FIG. 3 illustrates an AI system 1 according to an embodiment of the present disclosure.

FIG. 3 illustrates an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100*a*, the self-driving vehicle 100*b* may use the sensor information acquired from at least one sensor among the lidar, the radar, and the camera so as to determine the travel route and the travel plan.

In particular, the self-driving vehicle 100*b* may recognize the environment or objects for an area covered by a field of view or an area over a certain distance by receiving the sensor information from external devices, or may receive directly recognized information from the external devices.

The self-driving vehicle 100*b* may perform the above-described operations by using the learning model composed of at least one artificial neural network. For example, the self-driving vehicle 100*b* may recognize the surrounding environment and the objects by using the learning model, and may determine the traveling movement line by using the recognized surrounding information or object information. The learning model may be learned directly from the self-driving vehicle 100*a* or may be learned from an external device such as the AI server 200.

At this time, the self-driving vehicle 100*b* may perform the operation by generating the result by directly using the learning model, but the sensor information may be transmitted to the external device such as the AI server 200 and the generated result may be received to perform the operation.

The self-driving vehicle 100*b* may use at least one of the map data, the object information detected from the sensor information, or the object information acquired from the external apparatus to determine the travel route and the travel plan, and may control the driving unit such that the self-driving vehicle 100*b* travels along the determined travel route and travel plan.

The map data may include object identification information about various objects arranged in the space (for example, road) in which the self-driving vehicle 100*b* travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100*b* may perform the operation or travel by controlling the driving unit based on the control/interaction of the user. At this time, the self-driving vehicle 100*b* may acquire the intention information of the interaction due to the user's operation or speech utterance, and may determine the response based on the acquired intention information, and may perform the operation.

<AI+XR>

The XR device 100*c*, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100*c* may analyzes three-dimensional point cloud data or image data acquired from various sensors or the external devices, generate position data and attribute data for the three-dimensional points, acquire information about the surrounding space or the real object, and render to output the XR object to be output. For example, the XR device 100*c* may output an XR object including the additional information about the recognized object in correspondence to the recognized object.

The XR device 100*c* may perform the above-described operations by using the learning model composed of at least one artificial neural network. For example, the XR device 100*c* may recognize the real object from the three-dimensional point cloud data or the image data by using the learning model, and may provide information corresponding to the recognized real object. The learning model may be directly learned from the XR device 100*c*, or may be learned from the external device such as the AI server 200.

At this time, the XR device 100*c* may perform the operation by generating the result by directly using the learning model, but the sensor information may be transmitted to the external device such as the AI server 200 and the generated result may be received to perform the operation.

<AI+Robot+Self-Driving>

The robot 100*a*, to which the AI technology and the self-driving technology are applied, may be implemented as a guide robot, a carrying robot, a cleaning robot, a wearable robot, an entertainment robot, a pet robot, an unmanned flying robot, or the like.

The robot 100*a*, to which the AI technology and the self-driving technology are applied, may refer to the robot itself having the self-driving function or the robot 100*a* interacting with the self-driving vehicle 100*b*.

The robot 100*a* having the self-driving function may collectively refer to a device that moves for itself along the given movement line without the user's control or moves for itself by determining the movement line by itself.

The robot 100*a* and the self-driving vehicle 100*b* having the self-driving function may use a common sensing method so as to determine at least one of the travel route or the travel plan. For example, the robot 100*a* and the self-driving vehicle 100*b* having the self-driving function may determine at least one of the travel route or the travel plan by using the information sensed through the lidar, the radar, and the camera.

The robot 100*a* that interacts with the self-driving vehicle 100*b* exists separately from the self-driving vehicle 100*b* and may perform operations interworking with the self-driving function of the self-driving vehicle 100*b* or interworking with the user who rides on the self-driving vehicle 100*b*.

At this time, the robot 100*a* interacting with the self-driving vehicle 100*b* may control or assist the self-driving function of the self-driving vehicle 100*b* by acquiring sensor information on behalf of the self-driving vehicle 100*b* and providing the sensor information to the self-driving vehicle 100*b*, or by acquiring sensor information, generating environment information or object information, and providing the information to the self-driving vehicle 100*b*.

Alternatively, the robot 100*a* interacting with the self-driving vehicle 100*b* may monitor the user boarding the self-driving vehicle 100*b*, or may control the function of the self-driving vehicle 100*b* through the interaction with the user. For example, when it is determined that the driver is in a drowsy state, the robot 100*a* may activate the self-driving function of the self-driving vehicle 100*b* or assist the control of the driving unit of the self-driving vehicle 100*b*. The function of the self-driving vehicle 100*b* controlled by the robot 100*a* may include not only the self-driving function but also the function provided by the navigation system or the audio system provided in the self-driving vehicle 100*b*.

Alternatively, the robot 100*a* that interacts with the self-driving vehicle 100*b* may provide information or assist the function to the self-driving vehicle 100*b* outside the self-driving vehicle 100*b*. For example, the robot 100*a* may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
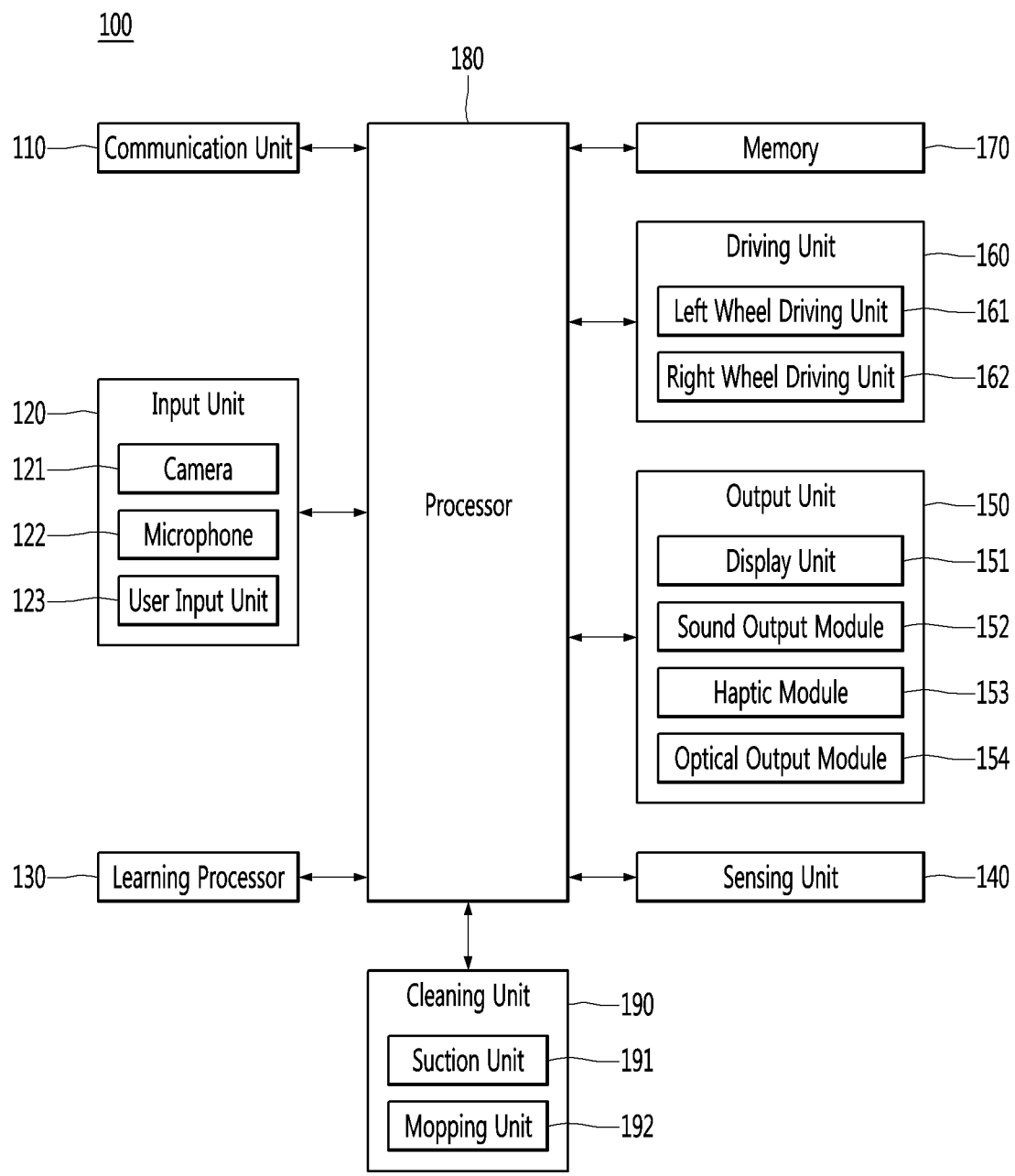
FIG. 4 is a block diagram illustrating an AI apparatus according to an embodiment of the present disclosure.

FIG. 4 illustrates an AI device 100 according to an embodiment of the present disclosure.

The redundant repeat of FIG. 1 will be omitted below.

Referring to FIG. 4, the AI device 100 may further include a driving unit 160 and a cleaning unit 190.

The input unit 120 may include a camera 121 for image signal input, a microphone 122 for receiving audio signal input, and a user input unit 123 for receiving information from a user.

Voice data or image data collected by the input unit 120 are analyzed and processed as a user's control command.

Then, the input unit 120 is used for inputting image information (or signal), audio information (or signal), data, or information inputted from a user and the mobile terminal 100 may include at least one camera 121 in order for inputting image information.

The camera 121 processes image frames such as a still image or a video acquired by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the mobile terminal 100. Moreover, various noise canceling algorithms for removing noise occurring during the reception of external sound signals may be implemented in the microphone 122.

The user input unit 123 is to receive information from a user and when information is inputted through the user input unit 123, the processor 180 may control an operation of the mobile terminal 100 to correspond to the inputted information.

The user input unit 123 may include a mechanical input means (or a mechanical key, for example, a button, a dome switch, a jog wheel, and a jog switch at the front, back or side of the mobile terminal 100) and a touch type input means. As one example, a touch type input means may include a virtual key, a soft key, or a visual key, which is displayed on a touch screen through software processing or may include a touch key disposed at a portion other than the touch screen.

The sensing unit 140 may be called a sensor unit.

The sensing unit 140 may include at least one of a depth sensor (not illustrated) or an RGB sensor (not illustrated) to acquire image data for a surrounding of the AI robot 100.

The depth sensor may sense that light irradiated from the light emitting unit (not illustrated) is reflected and return. The depth sensor may measure the difference between times at which the returning light is transmitted, an amount of the returning light, and a distance from an object.

The depth sensor may acquire information on a two dimensional image or a three dimensional image of the surrounding of the AI robot 100, based on the distance from the object.

The RGB sensor may acquire information on a color image for an object or a user around the AI robot 100. The information on the color image may be an image acquired by photographing an object. The RGB sensor may be named an RGB camera.

In this case, the camera 121 may refer to the RGB sensor.

The output unit 150 may include at least one of a display unit 151, a sound output module 152, a haptic module 153, or an optical output module 154.

The display unit 151 may display (output) information processed in the mobile terminal 100. For example, the display unit 151 may display execution screen information of an application program running on the mobile terminal 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the mobile terminal 100 and a user, and an output interface between the mobile terminal 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the mobile terminal 100. An example of an event occurring in the mobile terminal 100 includes message reception, call signal reception, missed calls, alarm, schedule notification, e-mail reception, and information reception through an application.

The driving unit 160 may move the AI robot 100 in a specific direction or by a certain distance.

The driving unit 160 may include a left wheel driving unit 161 to drive the left wheel of the AI robot 100 and a right wheel driving unit 162 to drive the right wheel.

The left wheel driving unit 161 may include a motor for driving the left wheel, and the right wheel driving unit 162 may include a motor for driving the right wheel.

Although the driving unit 160 includes the left wheel driving unit 161 and the right wheel driving unit 162 by way of example as in FIG. 4, but the present disclosure is not limited thereto. In other words, according to an embodiment, the driving unit 160 may include only one wheel.

The cleaning unit 190 may include at least one of a suction unit 191 or a mopping unit 192 to clean the floor around the AI device 100.

The suction unit 191 may be referred to as a vacuum cleaning unit.

The suction unit 191 may suction air to suction foreign matters such as dust and garbage around the AI device 100.

In this case, the suction unit 191 may include a brush or the like to collect foreign matters.

The mopping unit 192 may wipe the floor in the state that a mop is at least partially in contact with the bottom surface of the AI device 100.

In this case, the mopping unit 192 may include a mop and a mop driving unit to move the mop In this case, the mopping unit 192 may adjust the distance from the ground surface through the mop driving unit. In other words, the mop driving unit may operate such that the mop makes contact with the ground surface when the mopping is necessary.

Figure 5:
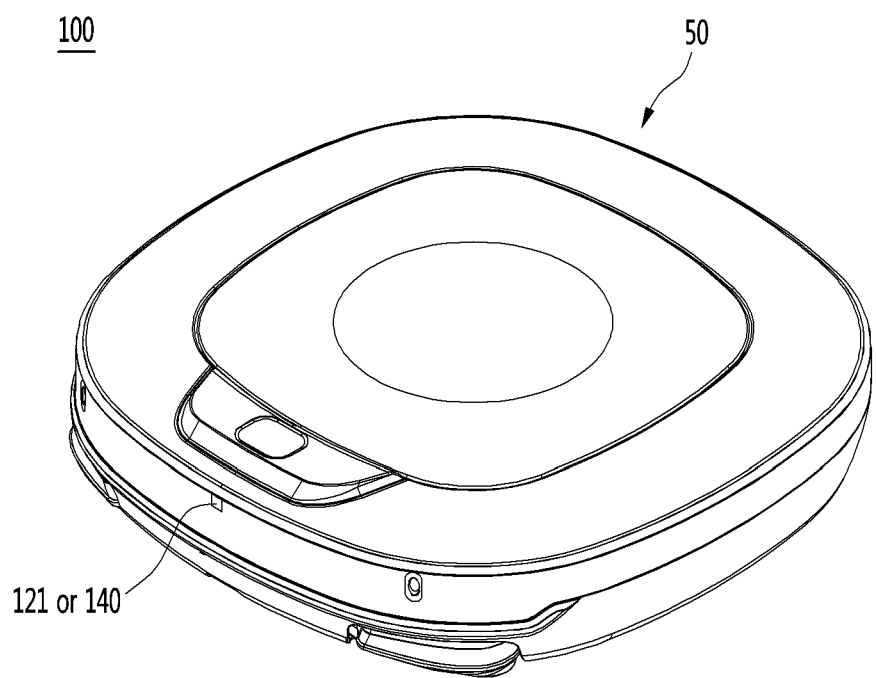
FIGS. 5 and 6 are block diagrams illustrating AI systems according to an embodiment of the present disclosure.

FIG. 5 a perspective view of the AI device 100 according to an embodiment of the present disclosure.

Referring to FIG. 5, the AI robot 100 may include a cleaner body 50 and a camera 121 or a sensing unit 140.

The camera 121 or the sensing unit 140 may irradiate a light forward and receive the reflected light.

The camera 121 or the sensing unit 140 may acquire the depth information using the difference between times at which the received lights are returned.

The cleaner body 50 may include remaining components except the camera 121 and the sensing unit 140 described with reference to FIG. 4.

Figure 6:
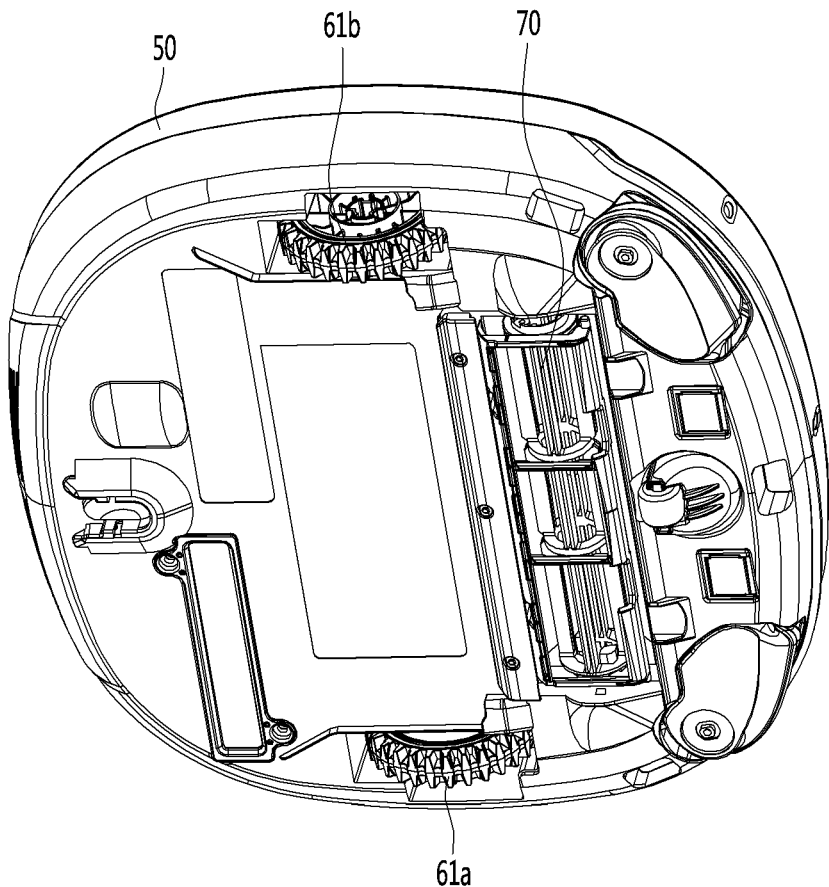

FIG. 6 is a bottom view of the AI device 100 according to an embodiment of the present disclosure.

Referring to 6, the AI device 100 may further include a cleaner body 50, a left wheel 61a, a right wheel 61b, and a suction unit 70 in addition to the components of FIG. 4.

The left wheel 61a and the right wheel 61b may allow the cleaner body 50 to travel.

The left wheel driving unit 161 may drive the left wheel 61a and the right wheel driving unit 162 may drive the right wheel 61b.

As the left wheel 61a and the right wheel 61b are rotated by the driving unit 160, the AI robot 100 may suction foreign matters such as dust and garbage through the suction unit 70.

The suction unit 70 is provided in the cleaner body 50 to suction dust on the floor surface.

The suction unit 70 may further include a filter (not illustrate) to collect foreign matters from the sucked air stream and a foreign matter receiver (not illustrated) to accumulate foreign matters collected through the filter.

In addition to the components of FIG. 4, the AI robot 100 may further include a mopping unit (not illustrated).

The mopping unit (not illustrated) may include a damp cloth (not illustrated) and a motor (not illustrated) to rotate the damp cloth in contact with the floor and to move the damp cloth along a set pattern.

The AI device 100 may wipe the floor with the mopping unit (not illustrated).

Figure 7:
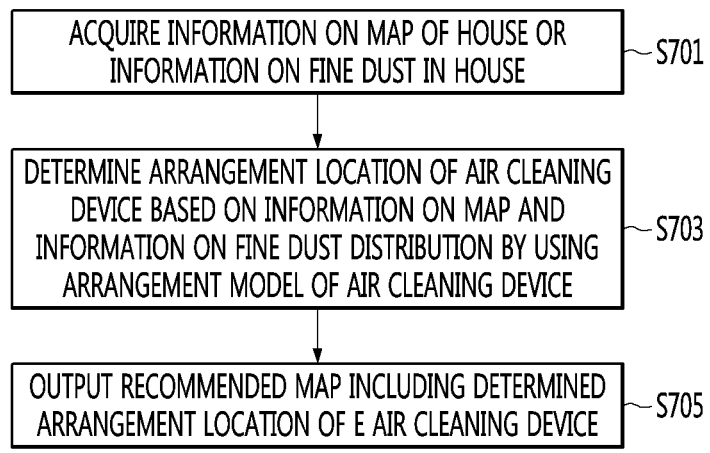
FIG. 7 is a flowchart illustrating an operating method of an AI device to guide the arrangement location of an air cleaning device according to an embodiment of the present disclosure.

FIG. 7 is a flowchart illustrating an operating method of an AI device to guide the arrangement location of the air cleaning device according to an embodiment of the present disclosure.

Hereinafter, the AI device 100 may be a device without the driving unit 160 and the cleaning unit 190 which are components illustrated in FIG. 4. The AI device 100 may be a mobile terminal such as a smartphone or a table PC of a user.

The processor 180 of the AI device 100 may acquire information on a map of a house or information on fine dust distribution in the house (S701).

The information on the map of the house may include information including a map showing a structure of the house. The information on the map of the house may include information such as the arrangement of furniture provided in the house, the plan view of the house, the position of an entrance in the house, the position of a room in the house, and the position of a living room in the house.

The information on the fine dust distribution in the house may be information representing fine dust distribution or ultrafine dust distribution, which is shown on the map of the house.

The information on the fine dust distribution in the house may be acquired by using the information on the map of the house.

The information on the map of the house and information on fine dust distribution in the house may be received from the robot cleaner 500.

The communication unit 110 of the AI device 100 may receive, from the robot cleaner 500, the information on the map of the house and the information on fine dust distribution in the house.

The robot cleaner 500 may measure fine dust or ultrafine dust while performing cleaning along a cleaning path in the house. To this end, the robot cleaner 500 may include a dust sensor.

The robot cleaner 500 may measure fine dust while traveling along the cleaning path and may mark a relevant zone on a map for cleaning, with the measured information on the fine dust. Through this procedure, the robot cleaner 500 may acquire the information on the fine dust distribution.

The processor 180 of the AI device 100 may determine the arrangement location of the air cleaning device based on the information on the map and the information on the fine dust distribution by using the arrangement model of the air cleaning device (S703).

The air cleaning device arrangement model may be a model based on a neural network trained through a deep learning algorithm or a machine learning algorithm.

The air cleaning device arrangement model may be trained by the learning processor 240 of the AI server 200. The AI device 100 may acquire the air cleaning device arrangement model from the AI server 200 through the communication unit 110.

For another example, the air cleaning device arrangement model may be trained by the learning processor 130 of the AI device 100.

The air cleaning device arrangement model may be a model trained in reinforcement learning.

Hereinafter, the procedure of training the air cleaning device arrangement model in the reinforcement learning will be described with reference to drawings after FIG. 7.

Figure 8:
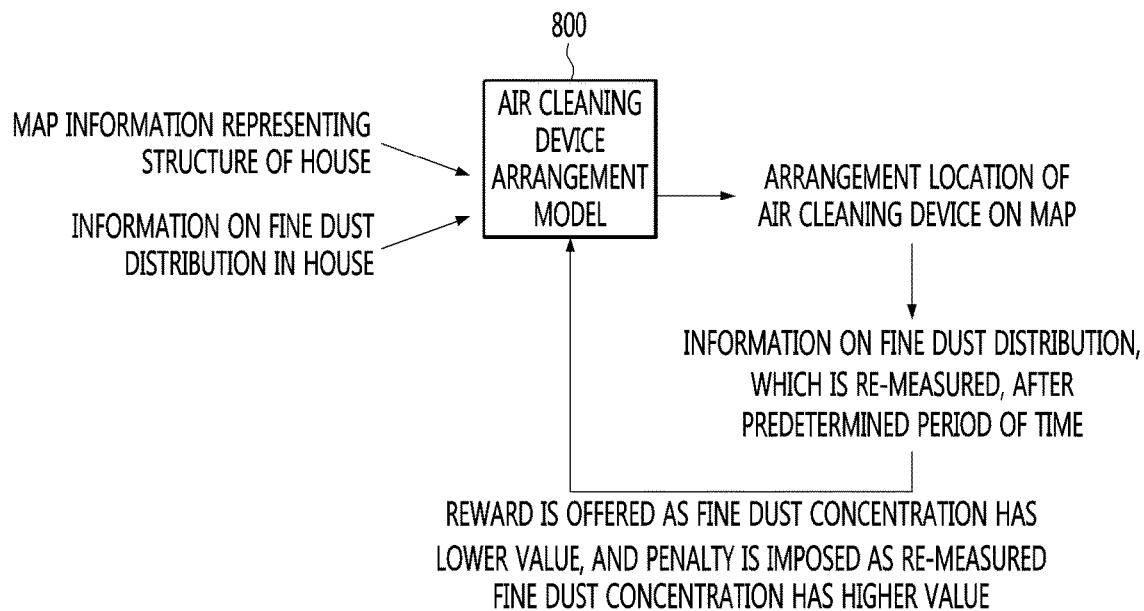
FIGS. 8 and 9 are views illustrating the procedure of training an air cleaning device arrangement model according to an embodiment of the present disclosure.
Figure 9:
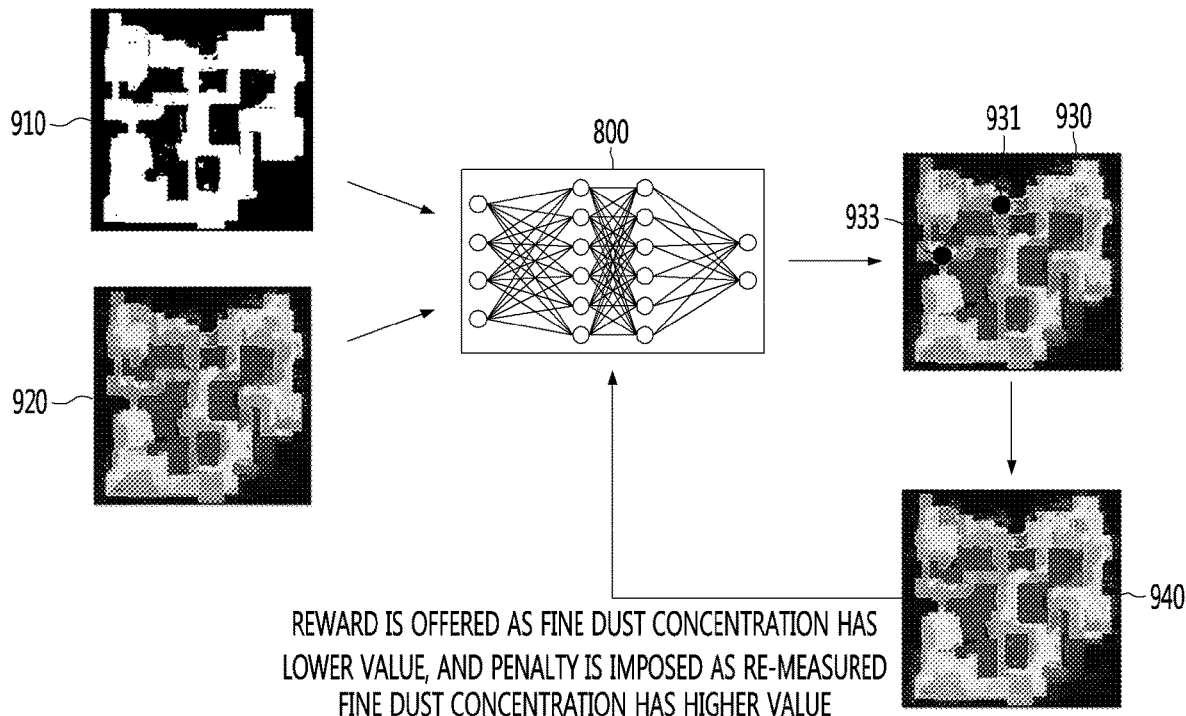

FIGS. 8 and 9 are views illustrating the procedure of training the air cleaning device arrangement model according to an embodiment of the present disclosure.

An artificial neural network to consistently determine or update parameters by performing training in the reinforcement learning may be named a reinforcement learning model herein.

An air cleaning device arrangement model 800 may be one example of the reinforcement learning model.

The reinforcement learning may be mainly performed through a Markov Decision Process (MDP).

Regarding the MDP, first there may be given an environment having information necessary for an agent to take a next action.

Second, how the agent takes the action based on the environment is defined.

Third, the types of actions that the agent receives a reward or a penalty are defined.

Fourth, training is repeatedly performed until a future reward becomes a maximum value, thereby deducting the optimal policy.

When the MDP is applied to the present disclosure, the agent may be an arrangement model of the AI device 100 or the air cleaning device.

First, the information on the map, which represents the structure of the house, and the information on the fine dust distribution in the house are given to constitute an environment having information necessary for the air cleaning device arrangement model 800 to take a next action.

Second, according to the present disclosure, how the air cleaning device arrangement model 800 takes the action based on the given environment, that is, where the air cleaning device arrangement model 800 arranges the air cleaning device in the house may be determined.

Third, after the air cleaning device is arranged depending on the arrangement of the air cleaning device, which is determined by the air cleaning device arrangement model 800, a reward is offered as the re-measured fine dust concentration has a lower value, and a penalty is imposed as the re-measured fine dust concentration has a higher value.

The air cleaning device arrangement model 800 may update the parameters of the artificial neural network based on the reward and the penalty.

Fourth, the air cleaning device arrangement model 800 is repeatedly trained until the future reward becomes the maximum point. Accordingly, the optimal policy may be acquired, that is, the optimal arrangement location of the air cleaning device is acquired to minimize the fine dust concentration in the house.

The parameters of the air cleaning device arrangement model 800 including the artificial neural network may be updated through feedback.

In addition, as the artificial neural network is trained, the action of the air cleaning device arrangement model 800 and the training result acquired using the feedback based on the action may be stored in the memory 170.

The training result may refer to the parameters of the air cleaning device arrangement model 800 updated through the fine dust concentration in the house or the feedback such as the reaction of a user. In addition, the training result may constitute a portion of the artificial neural network constituting the air cleaning device arrangement model 800.

The air cleaning device arrangement model 800 may be generated by training the artificial neural network in the AI sever 200. In addition, when the training is completed, the air cleaning device arrangement model 800 may be provided in the AI device 100.

Meanwhile, the air cleaning device arrangement model 800 may be implemented in hardware, software, or the combination of hardware and software. When a portion or an entire portion of the air cleaning device arrangement model 800 is implemented in software, at least one command constituting the air cleaning device arrangement model 800 may be stored in the memory 170.

The environment or the state used in training the air cleaning device arrangement model 800 may be named an input parameter for training.

The input parameter for training may include the information on the map representing the structure of the house or the information on the fine dust distribution in the house.

The information 910 on the map representing the structure of the house may include information such as the arrangement of the furniture in the house, the plan view of the house, which is acquired the structure of the house from the top, the position of an entrance in the house, or the position of each room in the house. The position of the furniture, the position of the entrance, or the position of each room may be a coordinate.

The information 920 on the fine dust distribution in the house may include a fine dust concentration measured in each of zones as the map of the house may be divided into the zones. The ultrafine dust concentration may be used instead of the fine dust concentration.

The information 920 on the fine dust distribution in the house may include the information 910 on the map representing the structure of the house.

The air cleaning device arrangement model 800 may output, as a result value, the arrangement location of the air cleaning device on the map representing the structure of the housing, using the input parameter for training.

The arrangement location of the air cleaning device may be output as a coordinate.

The air cleaning device arrangement model 800 may output a recommended map 930 including at least one arrangement location of the air cleaning device.

Referring to FIG. 9, arrangement locations 931 and 932 of the air cleaning device may be marked on the recommended map 930, with indicators.

Meanwhile, the learning processor 130 or the processor 180 of the AI device 100 acquires information 940 on the fine dust distribution, which is re-measured, in the house, after a predetermined period of time is elapsed, and may offer a reward to or impose a penalty to the air cleaning device arrangement model 800 based on the acquired information on the fine dust distribution.

The learning processor 130 or the processor 180 of the AI device 100 may offer a reward to the air cleaning device arrangement model 800 when an average fine dust concentration, which is re-measured, becomes smaller than an average fine dust concentration which is previously measured.

The re-measured average fine dust concentration may be an average value of fine dust concentrations measured by the robot cleaner in the zones in the house.

The learning processor 130 or the processor 180 of the AI device 100 may impose a penalty to the air cleaning device arrangement model 800 when the re-measured average fine dust concentration becomes larger than the previously-measured average fine dust concentration.

The learning processor 130 or the processor 180 of the AI device 100 may train the air cleaning device arrangement model 800 by repeatedly offering the reward to or imposing the penalty to the air cleaning device arrangement model 800.

Hereinafter, the description will be made again with reference to FIG. 7.

The processor 180 of the AI device 100 may output the recommended map including the determined arrangement location of the air cleaning device (S705).

According to an embodiment, the processor 180 may display the recommended map including the arrangement location of at least one air cleaning device on the display unit 151.

For another example, the processor 180 may output the at least one arrangement location of the at least one air cleaning device through the sound output unit 152.

For example, when the arrangement location of the air cleaning device is determined as the living room, the processor 180 may output, through the sound output unit 152, a sound of "Please, arrange the air cleaning device in the living room".

As described above, according to an embodiment of the present disclosure, the AI device 100 may recommend the optimal arrangement location of the air cleaning device in the house by measuring the fine dust distribution in the house. Accordingly, the user may arrange the air cleaning device in the optimal location, so the air condition in the house may be significantly improved.

Figure 10:
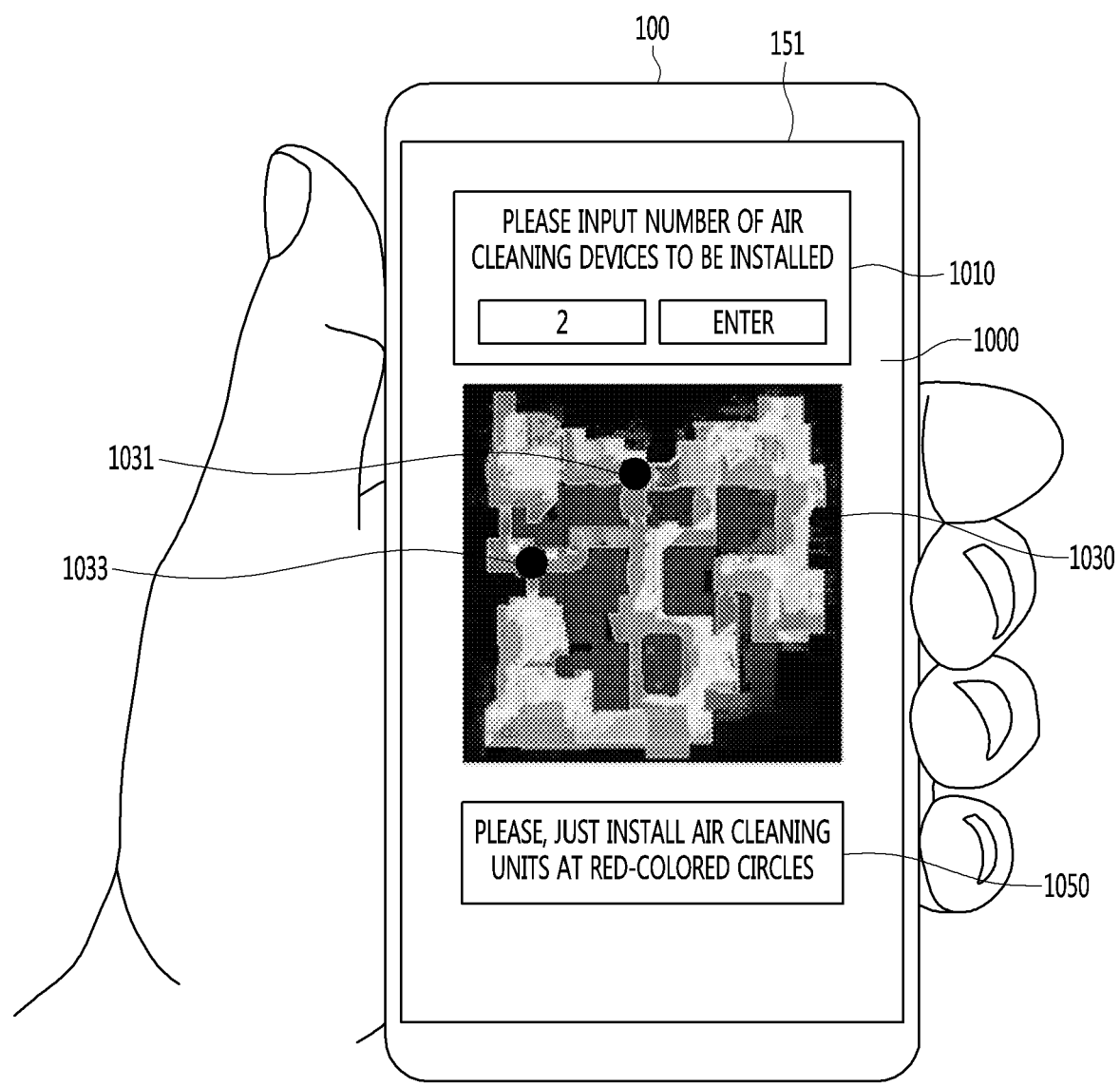
FIG. 10 is a view illustrating a user screen to guide the arrangement location of an air cleaning device according to an embodiment of the present disclosure.

FIG. 10 is a view illustrating a user screen to guide the arrangement location of the air cleaning device according to an embodiment of the present disclosure.

The AI device 100 may display, through the display unit 151, an arrangement guide screen 1000 for arranging the air cleaning device.

The arrangement guide screen 1000 may include a number input item 1010 for inputting the number of air cleaning devices, a recommended map item 1030 representing the arrangement locations corresponding to the input number of the air cleaning devices, and a guide text 1050.

The user may input the number of the air cleaning devices through the number input item 1010.

The AI device 100 may display, on the recommended map item 1030, a recommended map representing the optimal arrangement location of at least one air cleaning device depending on the input number of air cleaning devices.

In other words, the AI device 100 may determine the arrangement locations of two air cleaning devices, based on the air cleaning device arrangement model 800 and the input number of air cleaning devices.

For example, when the user inputs two air cleaning devices, the AI device 100 may identify the arrangement locations of the air cleaning devices on the recommended map using indicators 1031 and 1033. Each indicator may have the shape of a colored circle, but the present disclosure is not limited thereto.

A text may be further marked at the side of each indicator, in which the text indicates the arrangement location, such as a specific zone or the front of specific furniture, of the air cleaning device.

The user may receive a guide for the arrangement location of the air cleaning device, through the arrangement guide screen 1000 even if the user does not recognize the state of the fine dust distribution in house.

Figure 11:
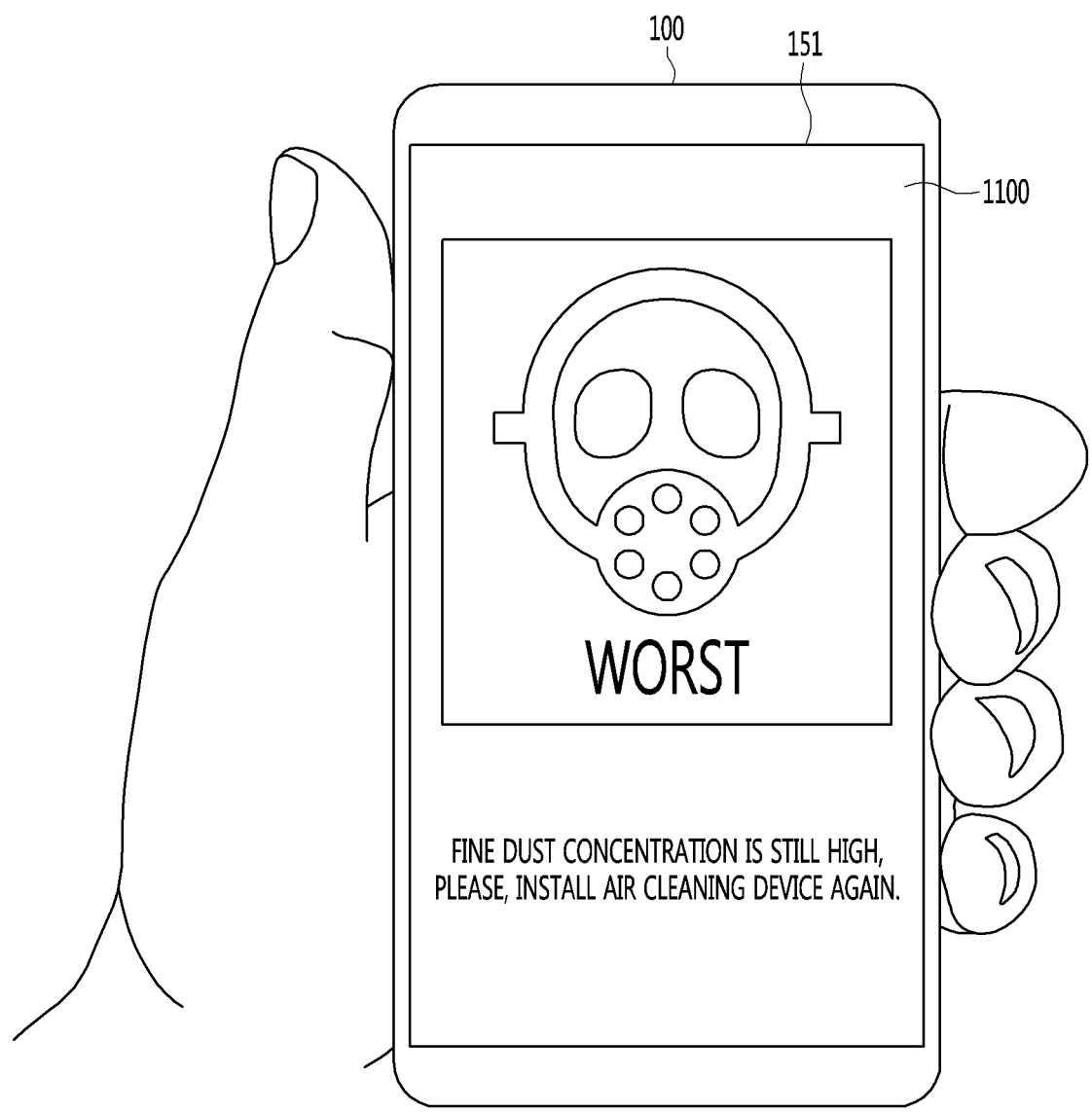
FIGS. 11 and 12 are views illustrating the procedure of re-recommending the optimal arrangement location of an air cleaning device as the air cleaning device arrangement model is trained in reinforcement learning.
Figure 12:
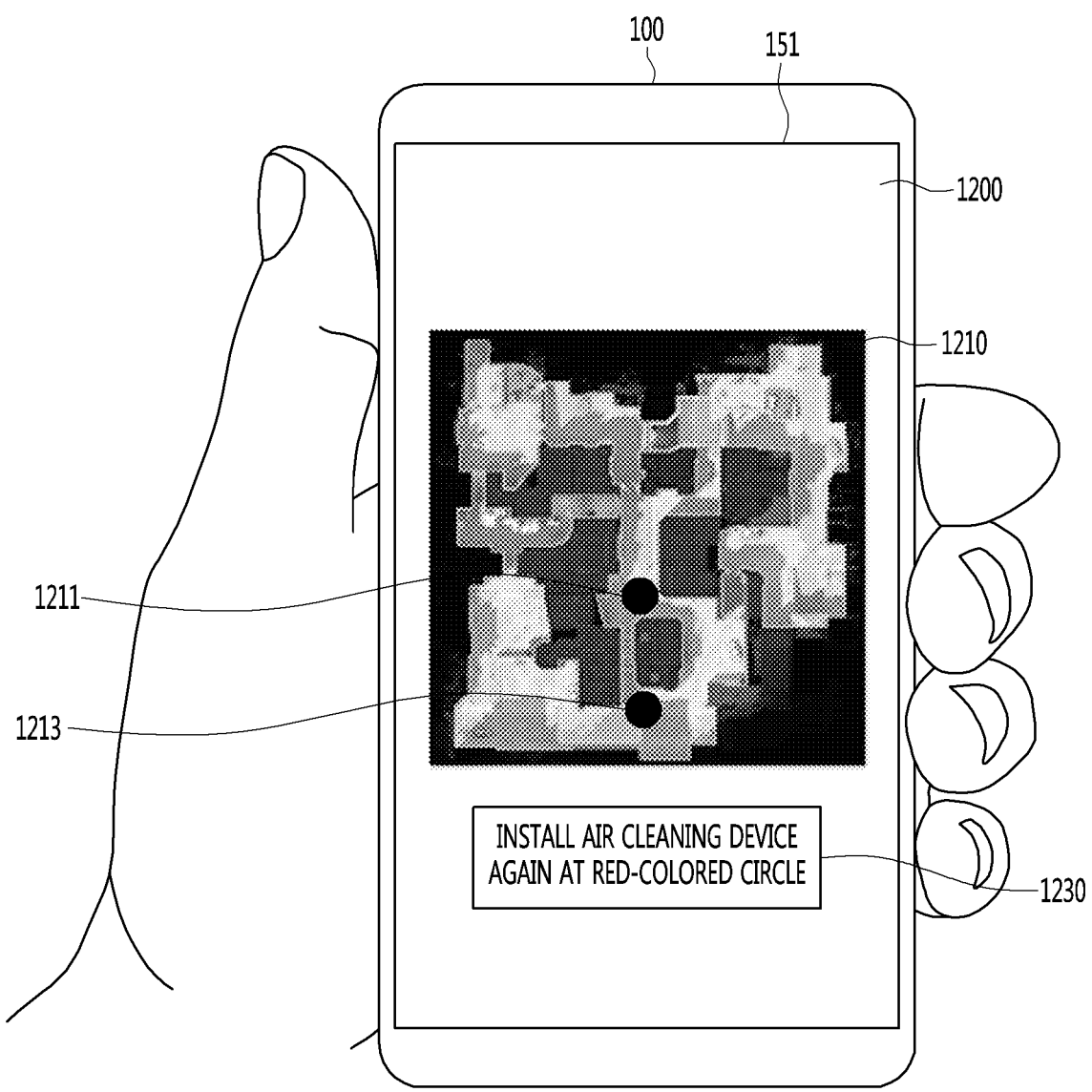

FIGS. 11 and 12 are views illustrating the procedure of recommending the optimal arrangement location of the air cleaning device again as the air cleaning device arrangement model is trained in reinforcement learning according to an embodiment of the present disclosure.

FIGS. 11 and 12 are views illustrating the situation that the user arranges two air cleaning devices in relevant locations after receiving the guide for the arrangement locations of two air cleaning devices according to an embodiment of FIG. 10.

First, referring to FIG. 11, the AI device 100 may receive the average fine dust concentration in the house, which is re-measured by the robot cleaner 500.

The AI device 100 may display, on the display unit 151, a fine dust state screen 1100 showing the state of fine dust deteriorated when the average fine dust concentration is smaller than the average fine dust concentration which is previously measured.

Thereafter, the AI device 100 may display, on the display unit 151, an arrangement correction guide screen 1200 to correct the arrangement location of the air cleaning device, based on the information on the re-measured fine dust distribution.

The arrangement correction guide screen 1200 may include a re-recommended map 1210 including red circles 1211 and 1213 representing the changed arrangement locations of the air cleaning device and a guide text 1230 to guide the re-recommended map 1210 and the re-arrangement of the air cleaning device.

The user may receive a guide for the change in the arrangement location of the air cleaning device, depending on the situation of fine dust distribution in house, which is varied in real time.

Hereinafter, the description will be made with reference to FIG. 13.

Figure 13:
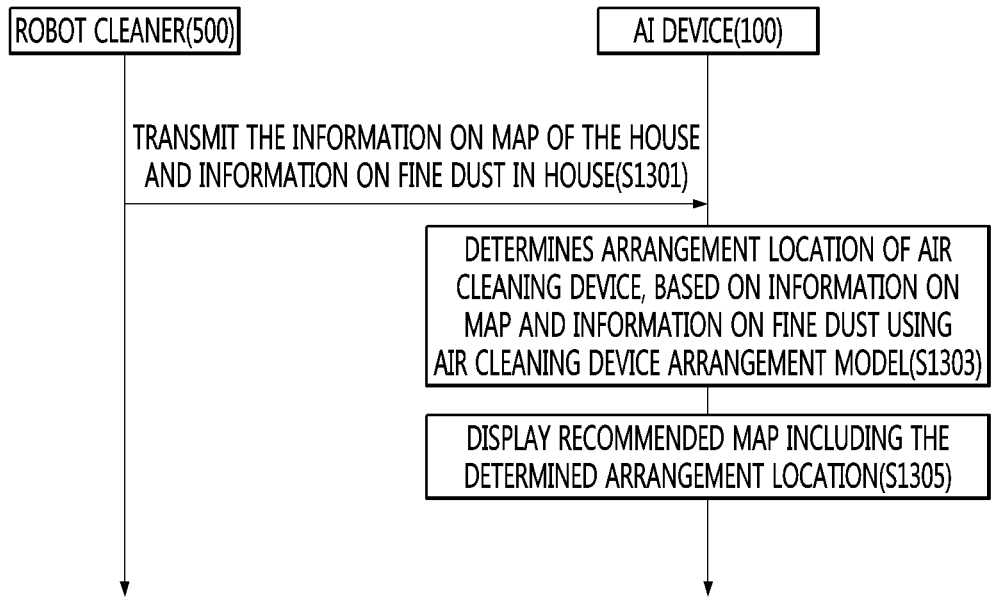
FIGS. 13 and 14 are views illustrating the operating method of an AI system, according to various embodiments of the present disclosure.
Figure 14:
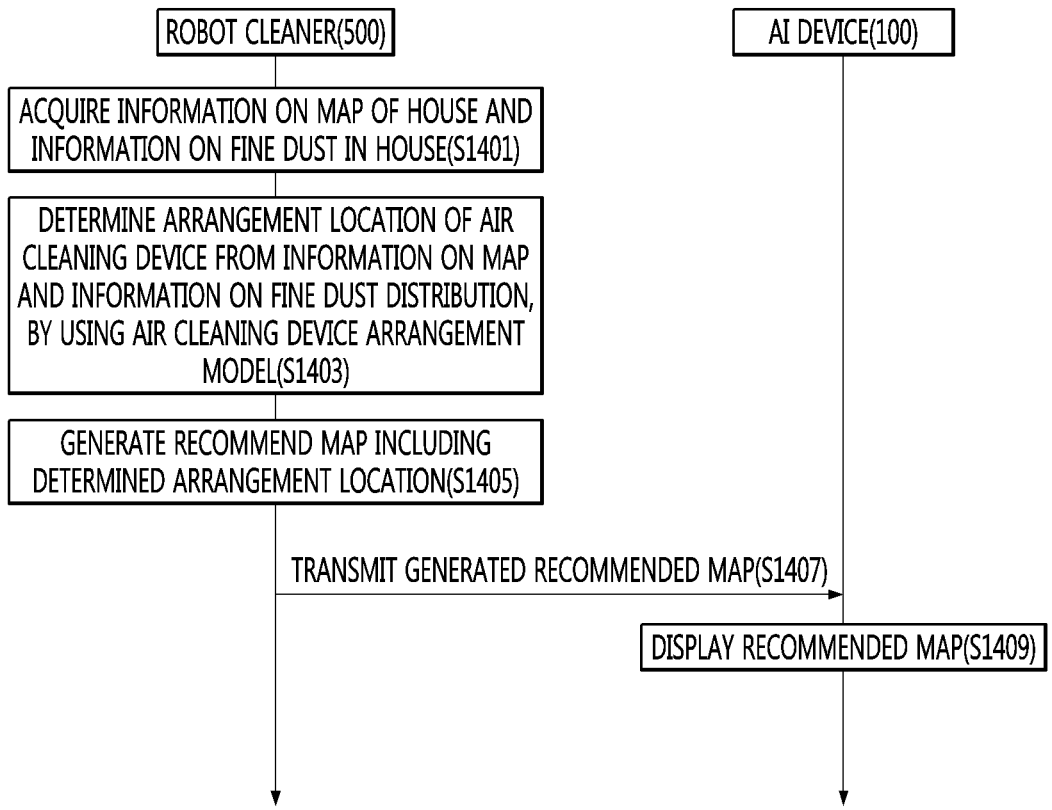

FIGS. 13 and 14 are views illustrating the operating method of an AI system, according to various embodiments of the present disclosure.

FIGS. 13 and 14 are embodiments in which subjects performing the steps in FIG. 7 are divided. The details of each step may be substituted with the description made with reference to FIG. 7.

First, the following description will be made with reference to FIG. 13.

Referring to FIG. 13, the robot cleaner 500 transmits the information on the map of the house and the information on the fine dust distribution in the house to the communication unit 110 of the AI device 100 (S1301).

In other words, the AI device 100 may receive the information on the map and the information on the fine dust distribution from the robot cleaner 500 to be used to determine the arrangement location of the air cleaning device.

The AI device 100 determines the arrangement location of the air cleaning device, based on the information on the map and the information on the fine dust distribution using the air cleaning device arrangement model (S1303).

The air cleaning device arrangement model may be received from the AI server 200 and provided in the AI device 100. For another example, the air cleaning device arrangement model is trained by the robot cleaner 500 and then received from the robot cleaner 500.

The AI device 100 displays, on the display unit 151, the recommended map including the determined arrangement location of the air cleaning device (S1305).

The following description will be made again with reference to FIG. 14.

Referring to FIG. 14, the processor 180 of the robot cleaner 500 acquires the information on the map of the house and the information on the fine dust distribution in the house (S1401).

The processor 180 of the robot cleaner 500 determines the arrangement location of the air cleaning device from the information on the map and the information on the fine dust distribution, by using the air cleaning device arrangement model (S1403).

The processor 180 of the robot cleaner 500 generates a recommend map including the determined arrangement location of the air cleaning device (S1405) and transits the generated recommended map to the AI device 100 through the communication unit 110 (S1407).

The AI device 100 outputs the recommended map received from the robot cleaner 500 on the display unit 151 (S1409).

As described above, according to an embodiment of FIG. 14, the robot cleaner 500 may mainly perform each step of FIG. 7.

The above-described invention is able to be implemented with computer-readable codes on a medium having a program. Computer-readable medium includes all types of recording devices having data which is readable by a computer system. For example, the computer-readable medium includes a hard disk drive (HDD), a solid state disk (SSD), a silicon disk drive (SDD), a ROM, a RAM, a CD-ROM, a magnetic tape, a floppy disk, or an optical data storage device.

What is claimed is:

1. An artificial intelligence (AI) device for guiding an arrangement location of an air cleaning device, the AI device comprising:
 a display unit configured to display an arrangement guide screen to guide the arrangement location of the air cleaning device;
 a memory to store an air cleaning device arrangement model to infer the arrangement location of the air cleaning device based on information on fine dust in a building; and
 a processor configured to:
 acquire information on a map of the building and information on fine dust distribution in the building;
 determine the arrangement location of the air cleaning device based on the information on the map and the information on the fine dust distribution using the air cleaning device arrangement model; and
 cause the display unit to display a map on the arrangement guide screen based on receiving a user input for a number of air cleaning devices, wherein the map on the arrangement guide screen comprises one or more indicators identifying arrangement locations of air cleaning devices, wherein the one or more indicators correspond to the number of air cleaning devices.

2. The AI device of claim 1, wherein the air cleaning device arrangement model is a model trained in reinforcement learning based on a deep learning algorithm or a machine learning algorithm, and
 wherein the reinforcement learning is performed through a Markov Decision Process (MDP).

3. The AI device of claim 2, wherein the processor is further configured to:
 acquire, as an output result of the air cleaning device arrangement model, the arrangement location of the air cleaning device from the information on the map and a fine dust distribution degree, and
 train the air cleaning device arrangement model by rewarding or penalizing the air cleaning device arrangement model based on a fine dust concentration in the building after the fine dust concentration is re-measured.

4. The AI device of claim 3, wherein the processor is further configured to:
 reward the air cleaning device arrangement model based on the re-measured fine dust concentration being lower than a previously measured fine dust concentration, and
 penalize the air cleaning device arrangement model based on the re-measured fine dust concentration being higher than the previously measured fine dust concentration.

5. The AI device of claim 4, wherein the processor is further configured to be repeatedly trained until a future reward for the air cleaning device arrangement model becomes a maximum value.

6. The AI device of claim 1, wherein the information on the map of the building is information comprising a map showing a structure of the building, and
 wherein the information on the fine dust distribution comprises information indicating the fine dust distribution on the map.

7. The AI device of claim 1, further comprising:
 a communication unit configured to communicate with a robot cleaner,
 wherein the communication unit receives the information on the map and the information on the fine dust distribution from the robot cleaner.

8. An operating method of an AI device to guide an arrangement location of an air cleaning device, the operating method comprising:
 displaying an arrangement guide screen to guide the arrangement location of the air cleaning device;
 acquiring information on a map of a building and information on fine dust distribution in the building;

determining the arrangement location of the air cleaning device based on the information on the map and the information on the fine dust distribution, by using an air cleaning device arrangement model to infer the arrangement location of the air cleaning device based on the information on the fine dust in the building;

outputting the determined arrangement location of the air cleaning device, and displaying a map on the arrangement guide screen based on receiving a user input for a number of air cleaning devices, wherein the map on the arrangement guide screen comprises one or more indicators identifying arrangement locations of air cleaning devices, wherein the one or more indicators correspond to the number of air cleaning devices.

9. The operating method of claim 8, wherein the air cleaning device arrangement model is a model to be trained in reinforcement learning based on a deep learning algorithm or a machine learning algorithm, and wherein the reinforcement learning is performed through a Markov Decision Process (MDP).

10. The operating method of claim 9, further comprising:

acquiring, as an output result of the air cleaning device arrangement model, the arrangement location of the air cleaning device from the map information and a fine dust distribution degree; and training the air cleaning device arrangement model by rewarding or penalizing the air cleaning device arrangement model based on a fine dust concentration in the building, wherein the fine dust concentration is re-measured.

11. The operating method of claim 10, further comprising:

rewarding the air cleaning device arrangement model based on the re-measured fine dust concentration being lower than a previously measured fine dust concentration, and penalizing the air cleaning device arrangement model based on the re-measured fine dust concentration based higher than the previously measured fine dust concentration.

12. The operating method of claim 11, wherein the air cleaning device arrangement model is repeatedly trained until a future reward for the air cleaning device arrangement model becomes a maximum value.

13. The operating method of claim 8, wherein the information on the map of the building is information comprising a map showing a structure of the building, and wherein the information on the fine dust distribution comprises information indicating the fine dust distribution on the map.

14. The operating method of claim 8, wherein the acquiring of the information on the map of the building and the information on the fine dust distribution in the building comprises:

receiving the information on the map and the information on the fine dust distribution from a robot cleaner.

* * * * *